US007911775B2

(12) United States Patent
Azami (10) Patent No.: US 7,911,775 B2
(45) Date of Patent: Mar. 22, 2011

(54) DISPLAY APPARATUS, FRONT PANEL UNIT AND METHOD OF MANUFACTURING FRONT PANEL UNITS

(75) Inventor: Hiroshi Azami, Chichibu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/632,500

(22) Filed: Dec. 7, 2009

(65) Prior Publication Data

US 2010/0231108 A1 Sep. 16, 2010

(30) Foreign Application Priority Data

Mar. 11, 2009 (JP) ................................. 2009-058366

(51) Int. Cl.
*G06F 1/16* (2006.01)
(52) U.S. Cl. ......... 361/679.21; 361/679.02; 361/679.29; 248/917; 349/58
(58) Field of Classification Search ............. 361/679.21; 349/58
See application file for complete search history.

(56) References Cited

U.S. PATENT DOCUMENTS

| | | | | |
|---|---|---|---|---|
| 5,486,942 A | * | 1/1996 | Ichikawa et al. ................ 349/58 |
| 5,570,267 A | * | 10/1996 | Ma ........................... 361/679.21 |
| 6,310,767 B1 | * | 10/2001 | Spear et al. .............. 361/679.24 |
| 6,937,297 B2 | * | 8/2005 | Kang et al. ...................... 349/58 |
| 7,142,264 B2 | * | 11/2006 | Choi et al. ....................... 349/58 |
| 7,518,671 B2 | * | 4/2009 | Maruta ........................... 349/58 |
| 7,626,807 B2 | * | 12/2009 | Hsu ........................... 361/679.21 |
| 7,750,237 B2 | * | 7/2010 | Jiang et al. ...................... 174/50 |
| 7,760,491 B2 | * | 7/2010 | Choi ........................ 361/679.01 |
| 7,777,726 B2 | * | 8/2010 | Sato et al. ...................... 345/173 |
| 2001/0035921 A1 | * | 11/2001 | Yamanami ...................... 349/58 |
| 2003/0147023 A1 | * | 8/2003 | Kang et al. ...................... 349/58 |
| 2004/0120104 A1 | * | 6/2004 | Jeong et al. .................... 361/681 |
| 2004/0156168 A1 | * | 8/2004 | LeVasseur et al. ............ 361/681 |
| 2005/0156907 A1 | * | 7/2005 | Sato et al. ...................... 345/173 |
| 2006/0050472 A1 | * | 3/2006 | Chen ............................. 361/681 |
| 2006/0203143 A1 | * | 9/2006 | Shin ............................... 349/58 |
| 2007/0030633 A1 | * | 2/2007 | Tseng ............................ 361/681 |
| 2007/0258198 A1 | * | 11/2007 | Minaguchi et al. ........... 361/681 |
| 2008/0019084 A1 | * | 1/2008 | Lee et al. ....................... 361/679 |
| 2008/0165480 A1 | * | 7/2008 | Tai et al. ........................ 361/681 |
| 2008/0285220 A1 | * | 11/2008 | Tai et al. ........................ 361/681 |
| 2009/0009678 A1 | * | 1/2009 | Cao ............................... 349/58 |
| 2009/0086123 A1 | * | 4/2009 | Tsuji et al. ...................... 349/58 |
| 2009/0122222 A1 | * | 5/2009 | Hamada ......................... 349/58 |
| 2009/0141198 A1 | * | 6/2009 | Kim .............................. 348/836 |
| 2009/0219459 A1 | * | 9/2009 | Kim .............................. 349/58 |

FOREIGN PATENT DOCUMENTS

JP 63-287883 11/1988

(Continued)

*Primary Examiner* — Jayprakash N Gandhi
*Assistant Examiner* — Anthony Q Edwards
(74) *Attorney, Agent, or Firm* — Blakely, Sokoloff, Taylor & Zafman LLP (57) ABSTRACT

According to one embodiment, a display apparatus includes a main body including a display and a front panel unit which covers a front surface of the display. The front panel unit includes a protection plate, a frame body formed into a frame shape such as to support an edge portion of the protection plate and including a plurality of through holes used to fix the protection plate, a plurality of pins which project from the protection plate in a direction crossing the protection plate and are to be put through the plurality of through holes, respectively, and screws which fix the protection plate and the frame body together.

8 Claims, 8 Drawing Sheets

FOREIGN PATENT DOCUMENTS

| | | |
|---|---|---|
| JP | 3082921 | 4/1991 |
| JP | 3146044 | 6/1991 |
| JP | 04-324489 | 11/1992 |
| JP | 05-061174 | 3/1993 |
| JP | 07-026867 | 1/1995 |
| JP | 07-102726 | 4/1995 |
| JP | 10-331385 | 12/1998 |
| JP | 2003-302909 | 10/2003 |
| JP | 2003-328533 | 11/2003 |
| JP | 2004-151277 | 5/2004 |
| JP | 2007-182134 | 7/2007 |
| JP | 2007-199705 | 8/2007 |
| JP | 2007-233402 | 9/2007 |

* cited by examiner

DISPLAY APPARATUS, FRONT PANEL UNIT AND METHOD OF MANUFACTURING FRONT PANEL UNITS

CROSS-REFERENCE TO RELATED APPLICATIONS

This application is based upon and claims the benefit of priority from Japanese Patent Application No. 2009-058366, filed Mar. 11, 2009, the entire contents of which are incorporated herein by reference.

BACKGROUND

1. Field

One embodiment of the present invention relates to a display apparatus containing a flat display screen.

2. Description of the Related Art

Jpn. Pat. Appln. KOKAI Publication No, 2007-199705 discloses a plasma display apparatus suitable for enlargement of screen. This plasma display apparatus includes a panel which serves as a display screen, a chassis, and a front panel protection cover which covers the front surface of the panel. The front protection cover includes a front panel frame having an opening portion, a protection plate made of a resin, glass or the like, and mounted in the opening portion, and a protection plate holding hardware which holds the protection plate from an inner side.

In this plasma display apparatus, the protection plate is mounted onto the front panel frame while being sandwiched between the rim of the opening portion and the protection plate holding hardware.

It should be noted here that some large-screen television sets employ a double-sided adhesive tape to fix the front panel frame and the protection plate together. Here, when such troubles occurs as dust enters between the front panel frame and the protection plate and a scratch made on the front panel frame during the assembly, the front panel frame and the protection plate are detached from each other and then rebuilt together. During this operation, the protection plate is removed against the adhesive force of the double-side tape, and therefore the protection plate is warped or the adhesive of the double-side tape remain on the front panel frame and the protection plate in some cases. In such cases, the front panel frame and the protection plate are no longer usable and must be disposed in many cases, creating such a waste during the manufacturing process.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a display apparatus includes a main body including a display and a front panel unit which covers a front surface of the display. The front panel unit includes a protection plate, a frame body formed into a frame shape such as to support an edge portion of the protection plate and including a plurality of through holes used to fix the protection plate, a plurality of pins which project from the protection plate in a direction crossing the protection plate and are to be put through the plurality of through holes, respectively, and screws which fix the protection plate and the frame body together.

An embodiment of a thin television which is an example of the display apparatus will now be described with reference to FIGS. 1 to 10.

Figure 1:
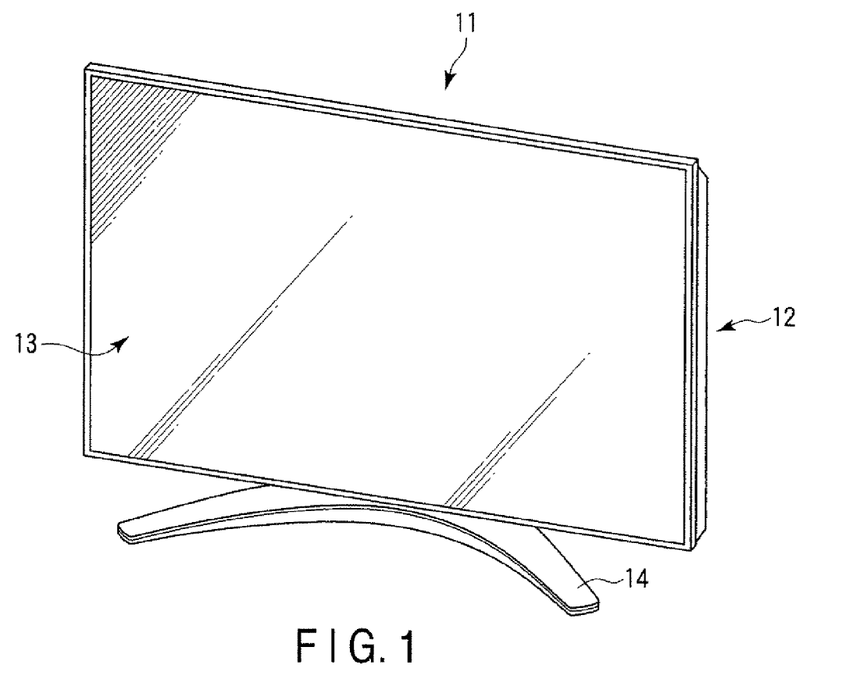
FIG. 1 is an exemplary perspective view showing a display apparatus according to the first embodiment.
Figure 2:
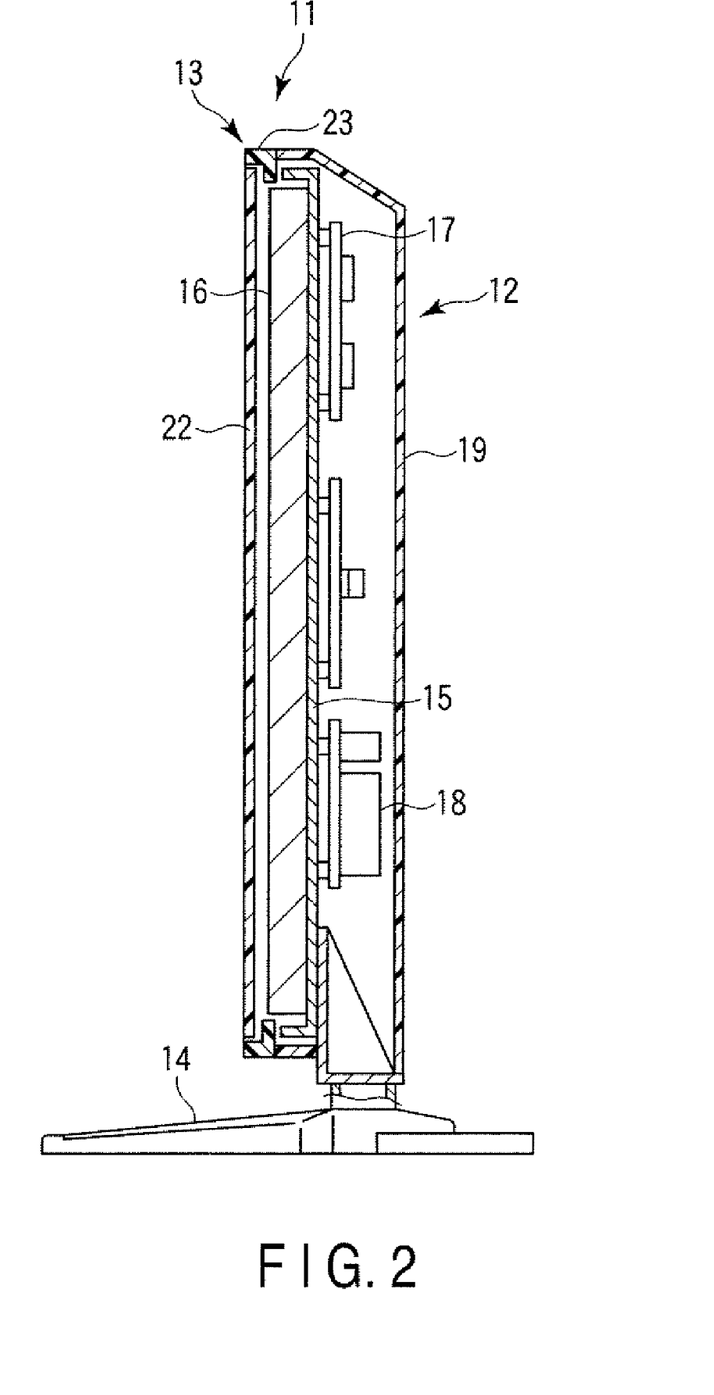
FIG. 2 is an exemplary cross sectional view of the display apparatus shown in FIG. 1 taken along its longitudinal direction.

As shown in FIGS. 1 and 2, a thin television 11 comprises a main body 12 including a liquid crystal panel, and a front panel unit 13 which covers the front surface of a liquid crystal panel 16. The main body 12 includes a stand 14, a square plate frame 15 supported above the stand, a liquid crystal panel 16 which is an example of the display mounted to the front surface of the frame 15, a panel controller 17 which drives the liquid crystal panel 16, a power unit 18 which supplies power to the liquid crystal panel 16, etc., and a rear surface cover 19 which covers the rear surface side of the main body 12.

The front surface 13 and the rear surface cover 19 form a housing which is an envelope of the thin television 11. The panel controller 17 and the power source unit 18 are fixed to, for example, the rear surface of the frame 15. In this embodiment, the liquid crystal panel 16 is used as an example of the display, but the present invention is not limited to this. The display may be some other type of display panel, for example, an organic EL device or plasma display.

Figure 3:
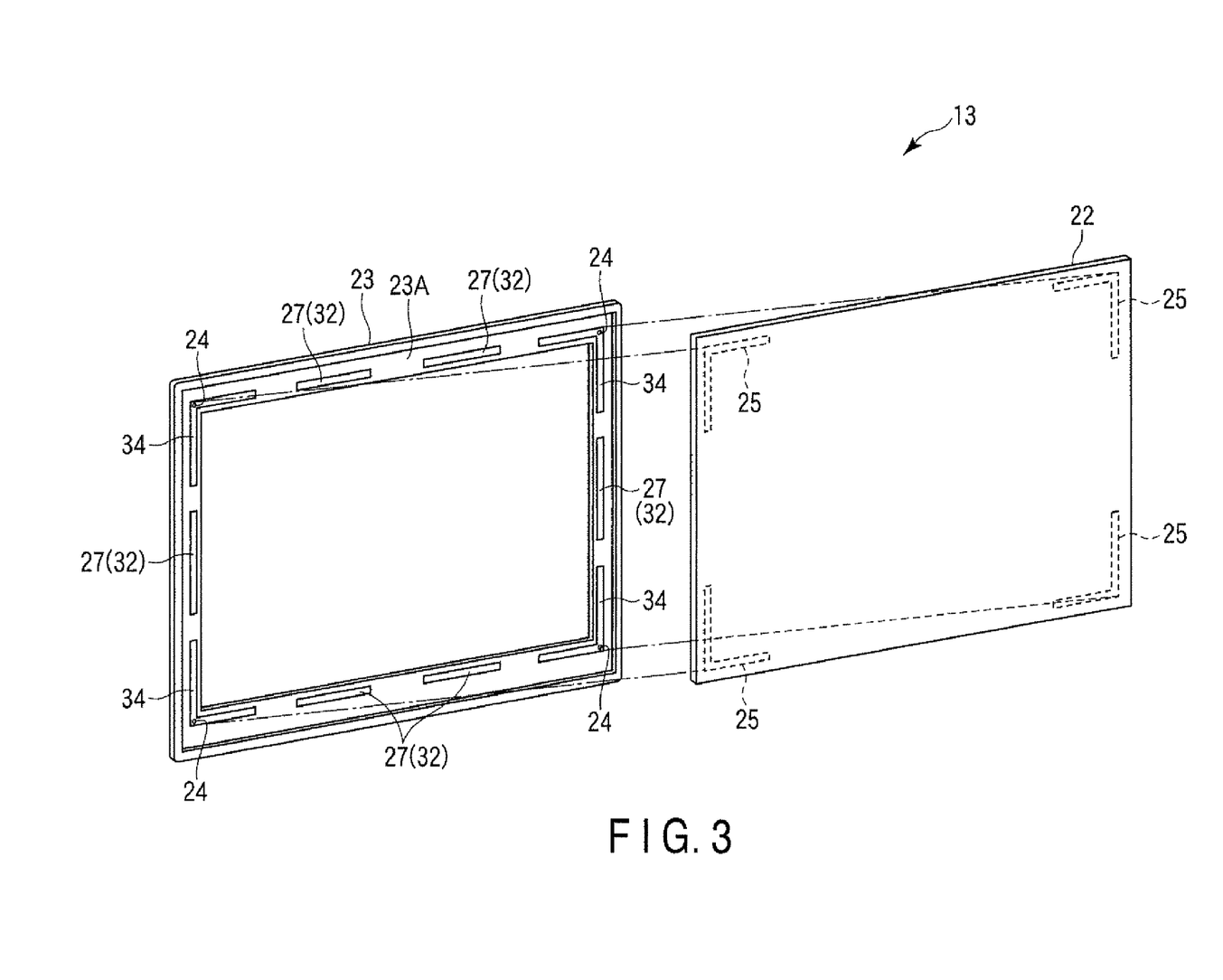
FIG. 3 is an exemplary decomposed perspective view showing a front side of the front panel unit of the display apparatus shown in FIG. 1.
Figure 4:
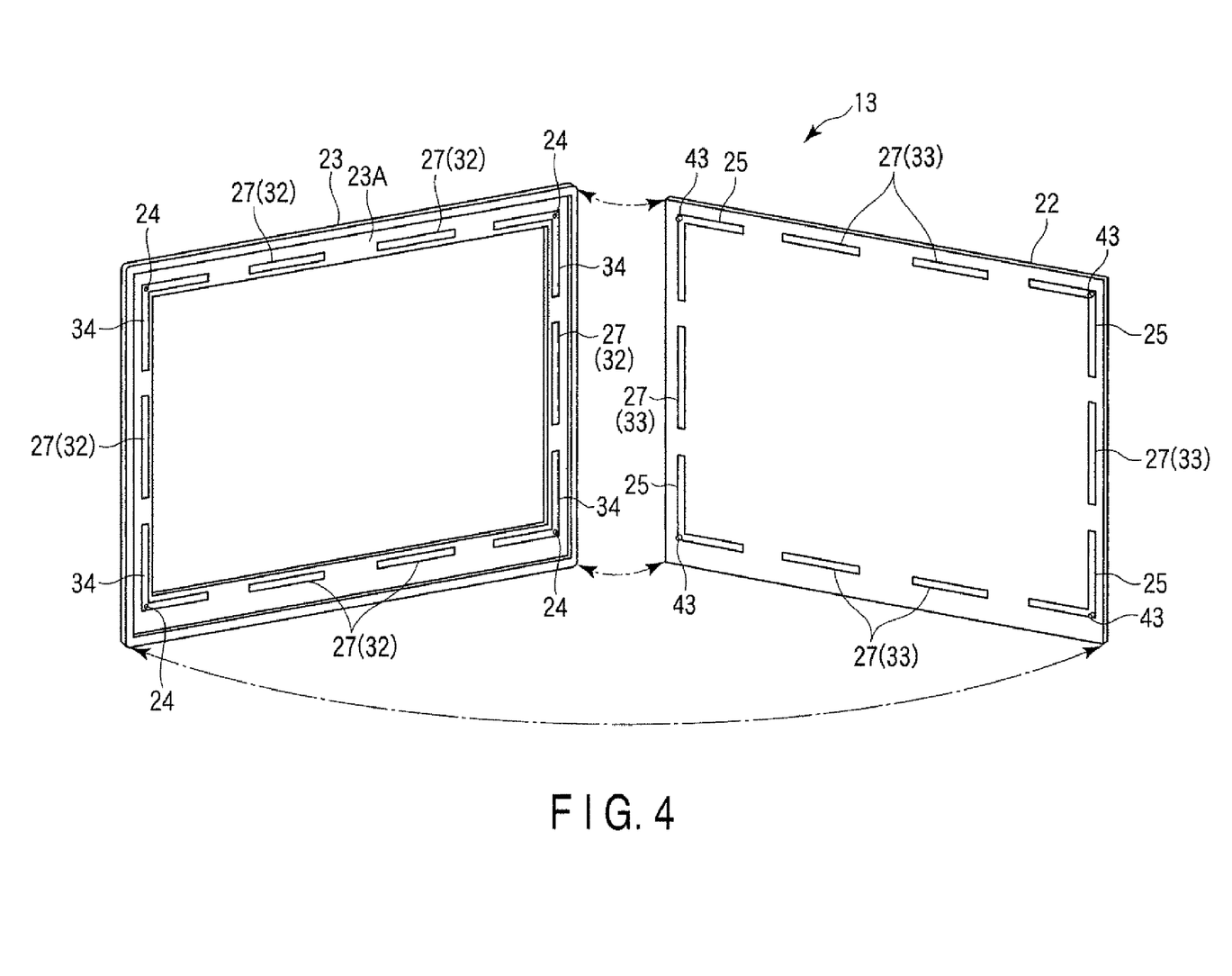
FIG. 4 is an exemplary decomposed perspective view showing a rear side of the front panel unit shown in FIG. 3 as it is developed in a direction different from that shown in FIG. 3.
Figure 10:
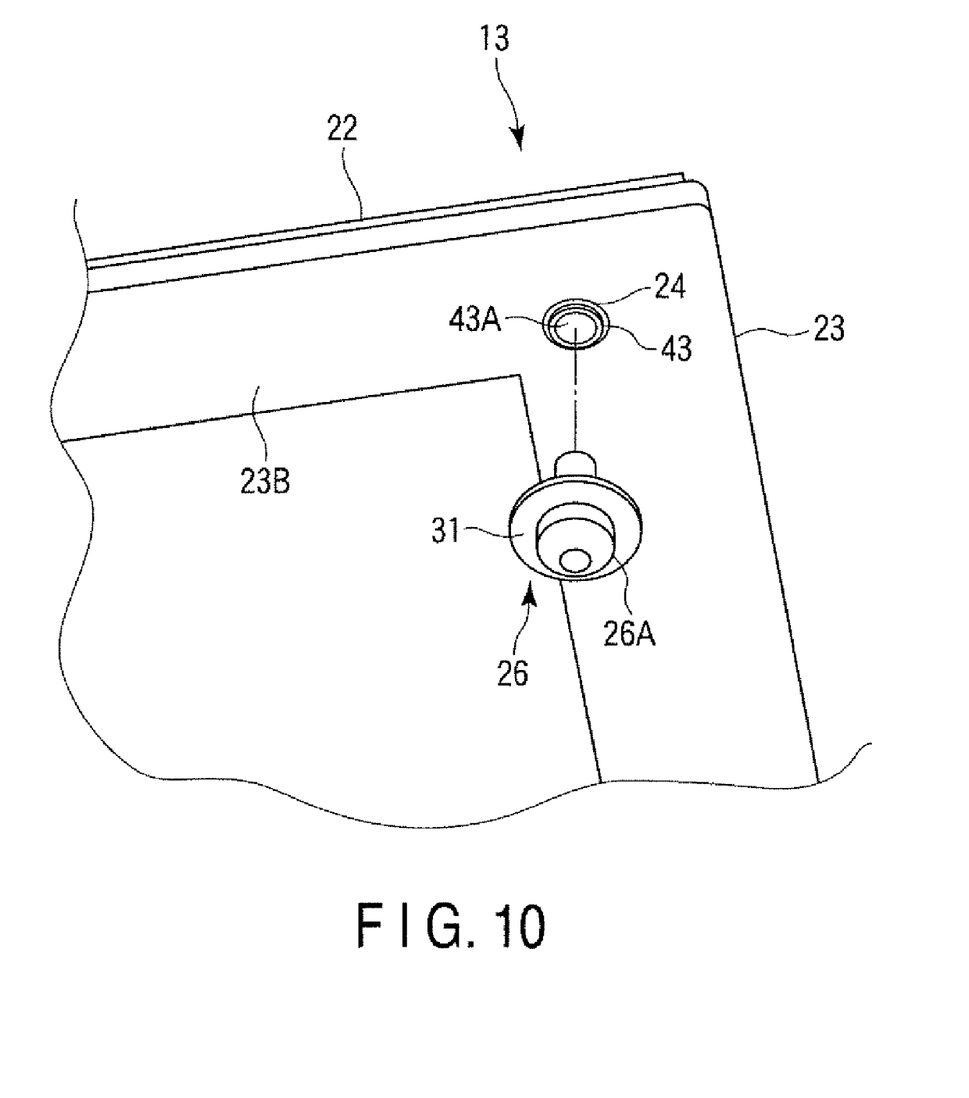
FIG. 10 is an exemplary perspective view of the front panel unit shown in FIG. 2, with an enlarged view of a fixation hole and a screw.

The front surface unit 13 is fixed to the frame 15 with means such as a screw. As shown in FIGS. 3, 4 and 10, the front surface unit 13 includes a protection plate 22, a frame body 23 which supports the edge portion of the protection plate 22, a plurality of through holes 24 made in the frame body 23, a plurality of reinforcing plates 25 adhered to the surface of the protection plate 22, which faces the frame body 23, a plurality of screws 26 which fix the protection plate 22 and the frame body 23 together, and a plurality of fastener members 27 interposed at a position between the protection plate 22 and the frame body 23.

The protection plate 22 is formed of, for example, an acryl-based resin into a transparent square plate shape. Each of the screws 26 includes a screw main body 26A and a metal washer 31 mounted to the screw main body 26A. It is preferable that each fastener member 27 should be of a detachable type. In this embodiment, the fastener members 27 are made of detachably attaching members in which surfaces are pressed against each other to stick them together (for example, the so-called Magic Tape (registered trademark) (hook and loop fastener). Each of the fastener member 27 includes a first portion 32 adhered to the frame body 23 and a second portion 33 adhered to the protection plate 22. Each of the first portion 32 and the second portion 33 has a sheet shape.

Figure 5:
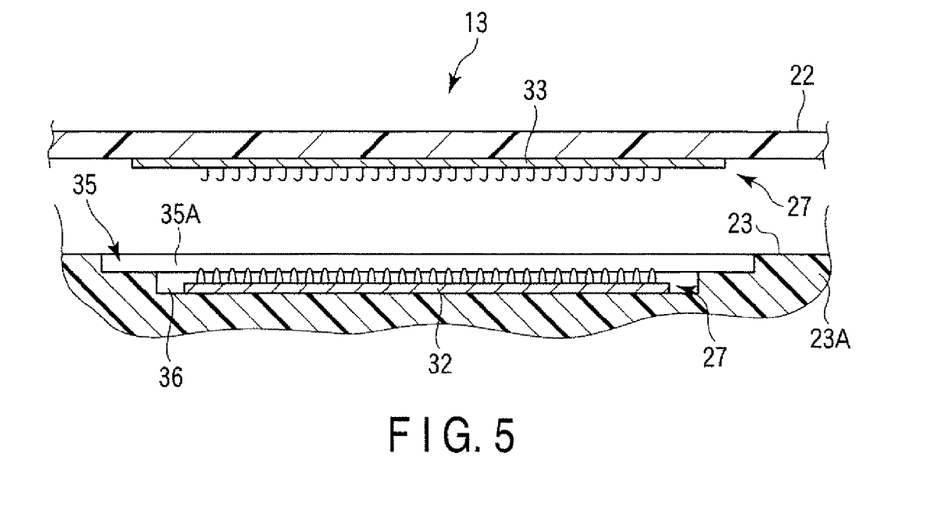
FIG. 5 is an exemplary cross sectional view of the front panel unit shown in FIG. 3 as it is cut in a lateral direction near the fastener member.
Figure 6:
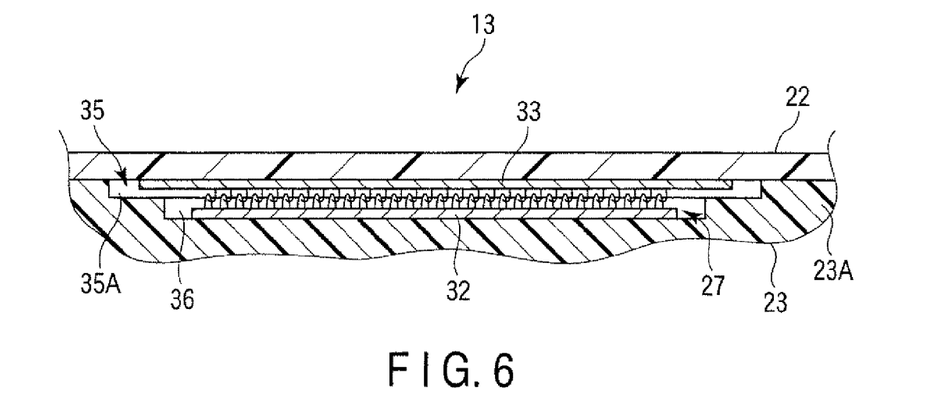
FIG. 6 is an exemplary cross sectional view of the front panel unit shown in FIG. 3 while the front panel frame and the protection plate thereof are preliminarily fixed together.
Figure 9:
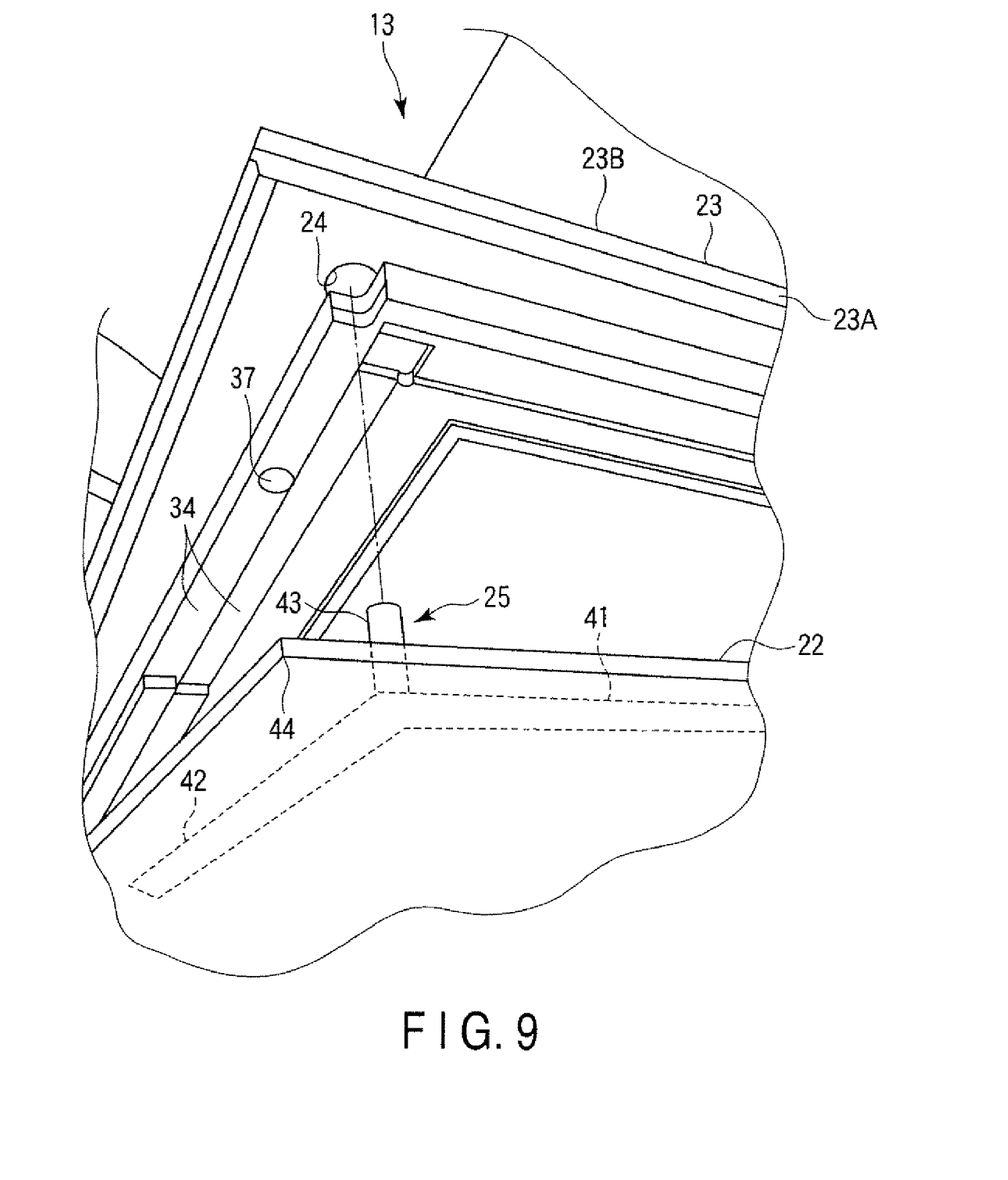
FIG. 9 is an exemplary decomposed perspective view of the front panel unit shown in FIG. 3, with an enlarged view of a portion thereof.

As shown in FIGS. 4 to 6, the frame body 23 includes a frame main body 23A having a frame shape, a first recess portion 34 recessed to correspond to the reinforcing plate 25 and a second recess portion 35 recessed to correspond to the fastener member 27. The frame main body 23A supports the edges of the four sides of the protection plate 22. The plurality of through holes 24 are made in the frame main body 23A and they are used to fixate the protection plate 22. As shown in FIGS. 5 and 6, the second recess portion 35 includes a recess main portion 35A recessed such as to house the second portion 33 of the fastener 27 and a deep recess portion 36 formed to be further recessed from the recess main body 35A, to which the first portion 32 of the fastening member 27 is adhered. As shown in FIG. 9, the frame body 23 further has an opening portion 37, to which an exclusive-use rod, through it is not shown in the figure, can be inserted. As the rod is inserted to the opening portion 37 and then operated, the protection plate 22 is separated from the frame body 23.

Figure 7:
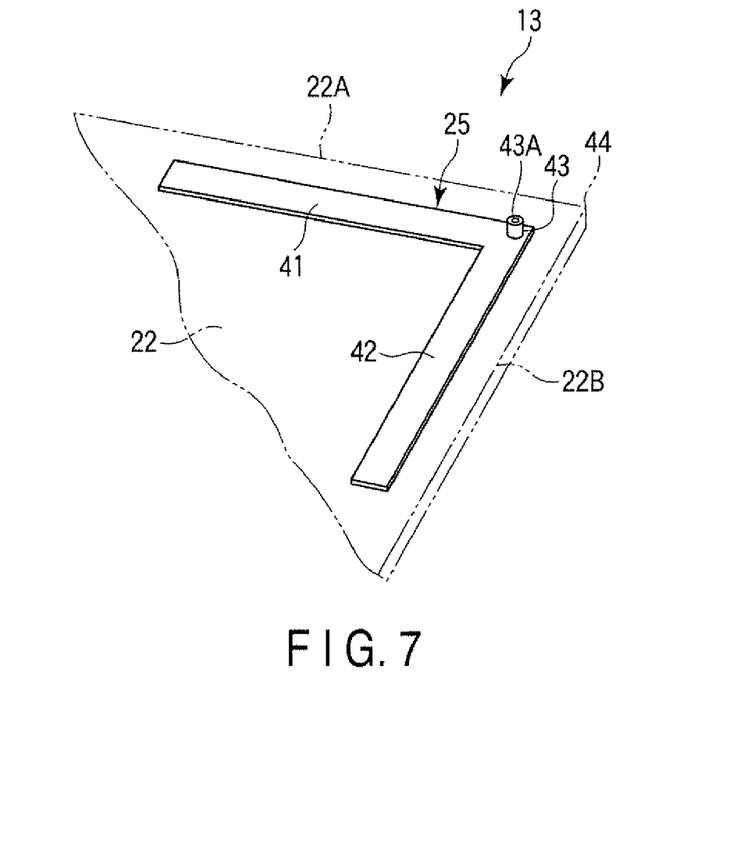
FIG. 7 is an exemplary perspective view showing a reinforcing plate of the front panel unit shown in FIG. 4, from a front surface side.
Figure 8:
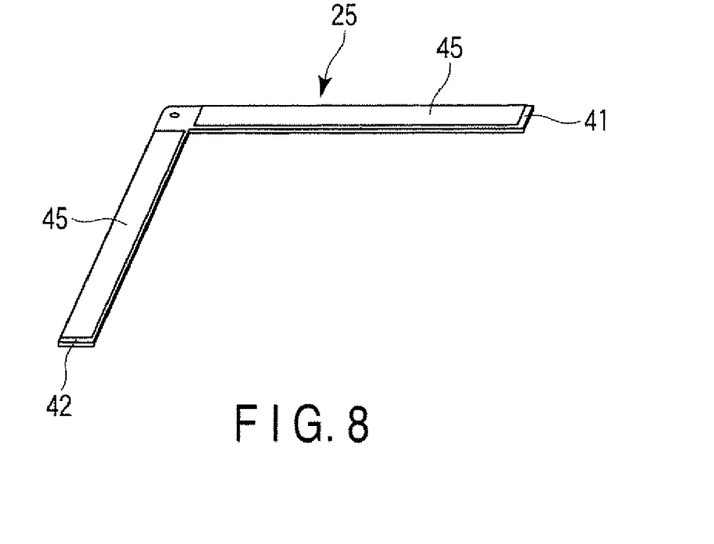
FIG. 8 is an exemplary perspective view showing the reinforcing plate shown in FIG. 7, from a rear surface side.

As shown in FIGS. 7 and 8, each of the reinforcing plate 25 is formed of such a material as into a flattened "L" letter shape. Each reinforcing plate 25 has a first arm portion 41, a second arm portion 42 which extends in a direction normally crossing the first arm portion 41, and a pin 43 integrally projecting from the joint portion which connects the first arm portion 41 and the second arm portion 42 together. The first arm portion 41 extends in a direction parallel to one side 22A adjacent to a corner portion 44 of the protection plate 22. On the other hand, the second arm portion 42 extends in a direction parallel to another side 22B of the protection plate 22. This side 22B is located adjacent to the corner portion 44 of the protection plate 22, and extends in a direction different from that of the side 22A, which is a normally crossing direction. The pin 43 can be put through inside a through hole 24 of the frame body 23. It should be noted that one side 22A and another side 22B of the protection plate 22 are of relative concept which corresponds to each of the reinforcing plates 25.

In each of the reinforcing plates 25, a double-sided adhesive tape 45 is adhered to the surface thereof opposite to the surface on which the pin 43 is provided. With the double-sided adhesive tape 45, the reinforcing plates 25 are firmly fixed to the protection plate 22.

The pin 43 is formed into a cylindrical shape and it extends in a direction crossing the surface of the protection plate 22, that is, a direction normally crossing the protection plate 22. The pin 43 is provided at a position corresponding to the corner portion 44 of the protection plate 22. The pin 43 has a fixation hole 43A at its distal end portion. The screw 26 can be engaged to the fixation hole 43A.

Next, the manufacturing process for the front panel unit 13 of this embodiment will now be described. First, as shown in FIGS. 3 and 4, the reinforcing plates 25 are positioned with respect to the protection plate 22, and then the reinforcing plates 25 are adhered to the protection plate 22 by utilizing the both-sided adhesive tape 45. During this operation, the reinforcing plates 25 each having an "L" letter shape are adhered to the positions corresponding to the respective corner portions 44 of the protection plate 22. After that, one or more fastener members 27 are fixed to the protection plate 22 in a location between each adjacent pair of reinforcing plates 25 (pins 43) to be in parallel with the respective sides of the protection plate 22. The first portion 32 of each fastener member 27 is adhered to the frame body 23 and the second portion 33 is adhered to the protection plate 22.

After that, as shown in FIGS. 3 and 9, the pins 43 of the reinforcing plates 25 are inserted to the through holes 24 of the frame body 23, respectively. In this manner, the protection plate 22 is positioned with respect to the frame body 23. Then, as shown in FIGS. 5 and 6, the second portion 33 is joined to the first portion 32 of each of the fasteners 27. During this operation, the second portion 33 adhered to the protection plate 22 is housed in the recess main body 35A of the second recess portion 35 of the frame body 23, and thus it is joined to the first portion 32 located in the deep recess portion 36. In this manner, the protection plate 22 and the frame body 23 are preliminary fixed together.

As shown in FIG. 10, the screw 26 is engaged to the fixation hole 43A of the respective pin 43 from the rear surface 23B of the frame body 23, and this time, the protection plate 22 and the frame body 23 are completely fixed together. During this operation, the metal washer 31 of the screw 26 is set on the rear surface 23B of the frame body 23 and the distal end portion of the respective pin 43, and thus the protection plate 22 and the frame body 23 are firmly fixed together.

According to the first embodiment, the thin television 11 comprises the main body 12 including a display and the front panel unit 13 which covers the front surface of the display. The front panel unit 13 further comprises the protection plate 22, the frame body 23 formed into a frame shape to support the edge portions of the protection plate 22 and having the plurality of through holes 24 used to fix the protection plate 22, the plurality of pins 43 projecting out from the protection plate 22 in a direction crossing the protection plate 22 and respectively put through the through holes 24, and the screws 26 which fix the protection plate 22 and the frame body 23 together.

With this structure, the protection plate 22 can be easily positioned with respect to the frame body 23 by utilizing the plurality of pins 43 and the plurality of through holes 24. In this manner, the step for assembling the front panel unit 13 can be simplified. Further, the protection plate 22 and the frame body 23 can be freely attached or detached from each other while omitting the use of the double-sided adhesive tape 45. In this manner, for example, in the case where dust enters between the frame body 23 and the protection plate 22, or a scratch is made on the frame body 23 or the protection plate 22, the frame body 23 and the protection plate 22 can be detached from each other without any excessive labor, thereby making it possible to minimize the generation of defective parts to be discarded as a waste.

The thin television 11 comprises the sheet-like fastener members 27 intermediated between the frame body 23 and the protection plate 22 so as to fix them together at positions between adjacent pairs of the pins. With this structure, the fastener members 27 can be used to preliminarily fix the frame body 23 and the protection plate 22 together. That is, in order to completely fixing the frame body 23 and the protection plate 22 together, the screws 26 are used, but in the stages where they are fixed with the screws 26, they are preliminarily fixed with use of the fastener members 27. In this manner, it is possible to hold the protection plate 22 and the frame body 23 while they are joined together in a preliminary fixation state until they are completely fixed with the screws 26, and thus the operability of the assembly of the front panel unit 13 can be remarkably improved. Further, with use of the fastener members 27, the tightness between the protection plate 22 and the frame body 23 can be also enhanced without using the double-sided adhesive tape 45, and thus the lifting of the protection plate 22 can be prevented. Furthermore, with use of the fastener members 27, even in the case of such a trouble of, for example, entering of dust as mentioned above, the protection plate 22 and the frame body 23 can be freely attached or detached from each other.

Moreover, the pins 43 each has the fixation hole 43A at its distal end, and the screws 26 are mounted to the fixation holes 43A respectively from the rear surface 23B of the frame body 23. With this structure, the pins 43 are used not only for the positioning, but also the fixing portions as well. With this structure, as compared to the case where the pins 43 and the fixing portions are separately provided, the overall structure can be simplified, and also the number of parts can be cut down.

It is preferable that these pins 43 should be provided at positions corresponding to the corner portions 44 of the protection plate 22. With this structure, the pins 43 are set at positions corresponding to the plurality of through holes 24 made in the frame body 23 even in the case where the distance between adjacent pairs of pins 43 is made long. As a result, the accuracy of the positioning of the protection plate 22 to the frame body 23 can be improved. Further, the thin television 11 comprises the reinforcing plates 25 each having the first arm portion 41 which extends in a direction parallel to one side 22A adjacent to a corner portion 44 of the protection plate 22, the second arm portion 42 which extends in a direction parallel to another side 22B of the protection plate 22, and the pin 43 integrally formed with these members, and attached to protection plate 22. With this structure, the protection plate 22 can be reinforced with the first arm portion 41 and the second arm portion 42. In more detail, the first arm portion 41 and the second arm portion 42 extend from each pin 43 provided at a position corresponding to the respective corner potion 44, in directions in parallel with one side 22A and another side 22B, respectively. With this arrangement, the protection plate 22 can be reinforced intensively in the vicinity of each corner portion 44, where stress is easily concentrated.

It is preferable that the frame body 23 should include recess portions to house the fastener members 27. With this structure, even if the fastener members 27 are interposed between the protection plate 22 and the frame body 23, the situation in which the protection plate 22 is warped by the thickness of the fastener members 27 can be prevented, thereby making it possible to achieve a full-flat thin television.

According to the method of manufacturing a front panel unit according to this embodiment, the plurality of pins 43 projecting from the protection plate 22 are respectively put through the plurality of through holes 24 made in the frame body 23, thereby positioning the protection plate 22 with respect to the frame body 23. Then, with use of the fastener members 27 interposed between the frame body 23 and the protection plate 22 respectively at positions between adjacent pairs of pins 43, the frame body 23 and the protection plate 22 are preliminarily fixed together. After that, the screws 26 are fixed to the plurality of pins 43 from the rear surface 23B of the frame body 23, and thus the frame body 23 and the protection plate 22 are completely fixed together.

With the above-described structure, the protection plate 22 can be positioned with respect to the frame body 23 using the plurality of through holes 24 and the plurality of pins 43. In this manner, the operation of positioning the protection plate 22 to the frame body 23 can be easily performed. Further, it is possible with the fastener members 27 to maintain the protection plate 22 and the frame body 23 jointed together in a preliminarily fix state, and therefore the situation in which the protection plate 22 and the frame body 23 are separated from each other until they are finally fixed together with the screws 26 can be prevented. Further, according to the present invention, there is no need to provide the double-sided adhesive tape 45 between the protection plate 22 and the frame body 23. Therefore, in the case where the protection plate 22 and the frame body 23 need to be disassembled for some reason, they can be separated without any excessive labor, thereby making it possible to minimize the number of parts to be discarded as a waste.

The display apparatus of the present invention can be applied not only to a thin television, but also, for example, the display of a personal computer. Further, it is possible to modify the display apparatus into various versions as long as the essence of the invention remains in its scope.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display apparatus comprising:
   a main body including a display; and
   a front panel unit which covers a front surface of the display, wherein the front panel unit further comprises:
   a protection plate;
   a frame body formed into a frame shape such as to support an edge portion of the protection plate and including a plurality of through holes used to fix the protection plate;
   a plurality of pins which project from positions corresponding to corner portions of the protection plate in a direction crossing the protection plate and are to be put through the plurality of through holes, respectively;
   screws which fix the protection plate and the frame body together;
   fastener members interposed between the protection plate and the frame body such as to fix the protection plate and the frame body together; and
   reinforcing plates adhered to the protection plate, the reinforcing plates each including a first arm portion which extends in a direction parallel to one side adjacent to the corner portion of the protection plate, a second arm portion which extends in a direction parallel to another side adjacent to the corner portion of the protection plate, and the pin integrally formed therewith.

2. The display apparatus of claim 1, wherein the plurality of pins each include a fixation hole at a distal end portion thereof, and the screws are mounted to the fixation holes from a rear surface of the frame body.

3. The display apparatus of claim 1, wherein the frame body includes recess portions corresponding to the reinforcing plates.

4. A display apparatus comprising:

a main body including a display; and a front panel unit which covers a front surface of the display, wherein the front panel unit further comprises:

a protection plate;

a frame body formed into a frame shape such as to support an edge portion of the protection plate and including a plurality of through holes used to fix the protection plate;

a plurality of pins which project from positions corresponding to corner portions of the protection plate in a direction crossing the protection plate and are to be put through the plurality of through holes, respectively;

screws which fix the protection plate and the frame body together; and fastener members interposed between the protection plate and the frame body such as to fix the protection plate and the frame body together, wherein the frame body includes recess portions in which the fastener members are to be housed.

5. The display apparatus of claim 4, wherein the plurality of pins each include a fixation hole at a distal end portion thereof, and the screws are mounted to the fixation holes from a rear surface of the frame body.

6. A front panel unit comprising:

a protection plate;

a frame body formed into a frame shape such as to support an edge portion of the protection plate and including a plurality of through holes used to fix the protection plate;

a plurality of pins which project from positions corresponding to corner portions of the protection plate in a direction crossing the protection plate and are to be put through the plurality of through holes, respectively;

screws which fix the protection plate and the frame body together;

fastener members interposed between the protection plate and the frame body such as to fix the protection plate and the frame body together; and reinforcing plates adhered to the protection plate, the reinforcing plates each including a first arm portion which extends in a direction parallel to one side adjacent to the corner portion of the protection plate, a second arm portion which extends in a direction parallel to another side adjacent to the corner portion of the protection plate, and the pin integrally formed therewith.

7. The front panel unit of claim 6, wherein the plurality of pins each include a fixation hole at a distal end portion thereof, and the screws are mounted to the fixation holes from a rear surface of the frame body.

8. The front panel unit of claim 6, wherein the frame body includes recess portions corresponding to the reinforcing plates.

* * * * *